United States Patent [19]

Hughes

[11] Patent Number: 5,093,597

[45] Date of Patent: Mar. 3, 1992

[54] BRUSHLESS EXCITER SATURABLE REACTOR DIODE SNUBBER

[75] Inventor: Kevin B. Hughes, Turtle Creek, Pa.

[73] Assignee: Westinghouse Electric Corp., Pittsburgh, Pa.

[21] Appl. No.: 591,310

[22] Filed: Oct. 1, 1990

[51] Int. Cl.$^5$ .............. H02K 11/00; H02K 3/16; H02K 23/04; H02H 7/06

[52] U.S. Cl. .................... 310/209; 310/72; 310/180; 310/68 D; 361/21

[58] Field of Search .......... 310/72, 179, 180, 182, 310/183, 190, 191, 209, 214, 68 D; 361/21, 18; 336/70, 30

[56] References Cited

U.S. PATENT DOCUMENTS

| | | | |
|---|---|---|---|
| 999,893 | 8/1911 | Skinner | 336/209 X |
| 2,788,500 | 4/1957 | Gunderson | 336/222 X |
| 3,976,902 | 8/1976 | Simmonds | 310/214 |
| 4,104,716 | 8/1978 | Ruggeri | 363/102 |
| 4,159,562 | 7/1979 | Liptak et al. | 310/214 |
| 4,164,705 | 8/1979 | Whitney et al. | 310/68 D |
| 4,333,027 | 6/1982 | Madsen | 310/214 |
| 4,739,207 | 4/1988 | Ying et al. | 310/214 |
| 4,750,077 | 6/1988 | Amagasa | 310/72 |
| 4,782,316 | 11/1988 | Domeki et al. | 310/180 |
| 4,843,271 | 6/1989 | Shah | 310/217 |

FOREIGN PATENT DOCUMENTS

| | | | |
|---|---|---|---|
| 2434731 | 2/1975 | Fed. Rep. of Germany | 310/183 |
| 2406861 | 8/1975 | Fed. Rep. of Germany | 310/183 |

*Primary Examiner*—Steven L. Stephan
*Assistant Examiner*—C. LaBalle

[57] ABSTRACT

A saturable reactor diode snubber assembly is provided for use with a brushless excitation system. The diode snubber provided includes a thin film member composed of a saturable magnetic material. The magnetic material is saturated for a large percentage of the current cycle of each pase of the ac exciter. When the current approaches zero and the diode approaches reverse recovery, the magnetic film member of the present invention comes out of saturation and turns linear increasing overall exciter inductance and decreasing current fall rate, thereby reducing reverse recovery peak current and diode stored energy. This in turn reduces the effects of voltage spikes normally experienced during diode reverse recovery. The magnetic material is used at a predetermined thickness such that a desired result is obtainable. One embodiment of the invention involves placing the magnetic material on the side of the armature slot wedge adjacent to the top coil.

6 Claims, 4 Drawing Sheets

BRUSHLESS EXCITER SATURABLE REACTOR DIODE SNUBBER

BACKGROUND OF THE INVENTION

1. Field of the Invention

This invention relates to brushless excitation systems for large electrical generators. The ac exciter of the excitation system has a diode wheel associated with it which operates to rectify ac excitation into dc current for supply to the generator rotor field winding. The invention provides a saturable reactor diode snubber assembly composed of multiple saturable reactor film members which are disposed along the length of coils in the rotating armature of the main exciter which film members result in reduction of diode stored charge and reverse recovery energy.

2. Background Information

Large electrical generators require external excitation which is provided by the exciter. Conventional systems provide exciter output connected to the generator field through a series of slip rings and brushes. An alternative system is a brushless exciter which is joined directly to the generator field winding without the need for U brushes and slip rings. The present invention relates to the brushless excitation system which employs a stationary field and generates an alternating current using a rotating armature. The ac must be rectified to supply dc to the generator field. This brushless system utilizes a rotating diode wheel rectifier. The rotating rectifier has the advantage that excitation is assured as long as the turbine generator shaft is rotating as the brushless exciter derives its power from the main generator shaft. This enables the direct-coupled, shaft-driven exciter to be an extremely reliable machine.

Ac output from the exciter is rectified by wheel-mounted diodes on the rotor shaft producing a dc voltage. The excitation voltage is fed directly to the field winding in the generator rotor by short leads located in the center of the shaft or which pass to diametrically opposed slots on the periphery of the exciter to generator coupling.

One difficulty faced with solid state rectification systems used with brushless exciters is that power semiconductor turnoff transients are generated. Diode turnoff in brushless exciters results in voltage spikes which can harm the system and can ultimately lead to unnecessary system stoppage. One approach to lowering the level of voltage spikes at diode turnoff involves placing a capacitor across the diode which absorbs the stored charge on reverse recovery and thereby eliminates the problems due to voltage spikes caused during reverse recovery.

Such capacitors, however, require space and add further weight to assemblies. Space and weight restrictions on the diode wheels are severe due to the 1800 rpm or 3600 rpm operating condition. In order to withstand the centrifugal forces, the diode snubber capacitor designs result in bulky assemblies which occupy substantial space which would preferably be utilized for additional diode modules, heat sinks, and air space for cooling purposes.

In other applications, such as ac phase conductors, it has been known to employ saturable reactors to mitigate power semiconductor turn-on/turnoff transients. However, the problem in the case of a brushless exciter is that there has been no obvious place to install a saturable reactor without jeopardizing the mechanical reliability of the system.

There remains a need, therefore, for an improved diode snubber assembly which acts to eliminate or reduce the effects of voltage spikes and stored charge transients which occur during diode turnoff.

There remains a further need for such a diode snubber which can achieve higher power densities with a more spacious layout allowing increased range of design opportunities for diode modules and heat sinks, and which can also be fitted to existing systems without any rewinding of the exciter.

SUMMARY OF THE INVENTION

These and other needs are satisfied by the present invention which provides a saturable reactor diode snubber assembly for use with a large electrical generator. The diode snubber assembly is composed of a plurality of saturable reactor film members which operate to reduce the effect of diode turnoff reverse recovery while being capable of installation without jeopardizing the mechanical reliability of the system. The invention involves placing the saturable reactor film component in the ac exciter armature slot. Specifically, the saturable reactor thin film member is placed between the slot wedge and the top coil or, alternatively, within a modified slot wedge. More particularly, a thin strip of magnetic low-loss material is placed adjacent to the top coil and acts along the entire active length of the armature coil. This obviates the need for bulky and heavy iron-core saturable components anywhere in the power circuit.

The thin magnetic film strip operates in saturation for about 99% of the diode conduction period. In this way, it has negligible effects on machine reactances and slot losses. During diode turnoff, however, the saturable reactor film member comes out of saturation, turns linear and effectively increases the exciter inductance many times. The diode stored charge and the total reverse recovery energy are reduced due to a greatly reduced phase current fall rate at a current approaching zero as discussed more fully hereinbelow. An order of magnitude decrease in current fall rate results in diode stored charge reverse recovery energy being reduced by at least 50%. This allows the flexibility in design such that a decrease in diode snubber capacitor size and weight can be achieved.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
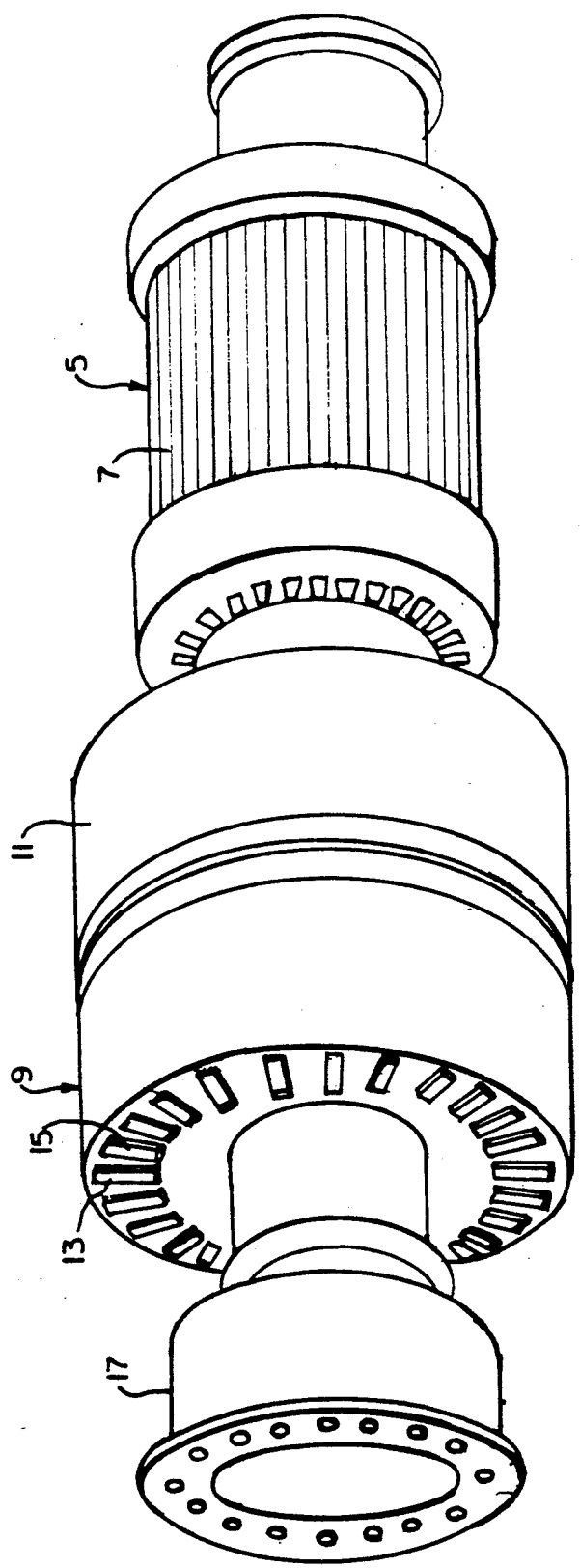
FIG. 1 is an isometric view of the brushless exciter rotor.

The main components of a brushless exciter are: a pilot exciter, an ac exciter and a rectifier wheel. Referring to FIG. 1, the rotor of an ac exciter is shown. Armature 5 is a machined piece of stainless steel which has slots therein such as slot 7. These slots contain the coils of the armature which are not visible in FIG. 1. The rotor also contains diode wheel 9. Diode wheel 9 is contained within a housing 11 which houses a plurality of diodes which are discussed more fully below. Diode wheel 9 also contains fuses for the diode circuit such as those designated reference characters 13 and 15. Additionally, the rotor of the excitation system contains coupling member 17 at one end of the rotor which directly couples with the main generator shaft. The brushless exciter derives its drive power from the main generator shaft which is not shown in FIG. 1.

Figure 2:
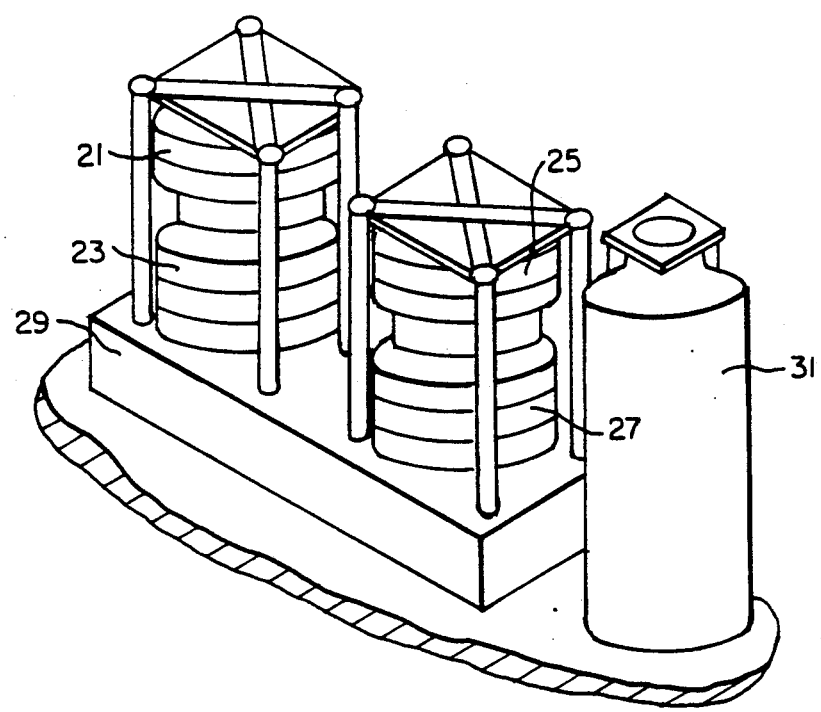
FIG. 2 is a schematic isometric view of an exemplary diode module of a diode wheel assembly.

Referring now to FIG. 2, a typical diode module which is contained within diode wheel 9 of FIG. 1 is discussed. Diodes 21, 23, 25 and 27 are flat-disk, pressure-type diodes which are packaged within aluminum heat sink material. The diodes 21 through 27 are also connected to capacitor member 29 which, as discussed more fully below, can be either eliminated or greatly reduced in size utilizing the system of the present invention. Fuse 31 is also provided to disconnect any shorted diode from the power circuit.

A particular number of diodes is required per phase per polarity for the system. For example, in a 600 V, 7000A dc brushless exciter, twelve parallel diodes per phase per polarity can be used. This results in a total of 72 diodes in the diode wheel. (FIG. 1). Other exciter designs may include far fewer diodes. In such cases the diodes are larger and involve reverse recovery issues of still greater importance.

As mentioned herein, the diodes of the system are connected in bridge configuration in order that the ac voltage output of the main ac exciter may be rectified to dc for supply to the main generator. More particularly, referring to FIG. 3, a Y-connected three-phase rotating armature is designated by reference character 35. Rotating armature 35 is associated with a stationary ac exciter field winding 36. A typical armature used in such circumstances would be a 500 volt, 5600 amp 180 Hz ac three-phase rotating armature with six parallels per phase. In the equivalent circuit of FIG. 3, each phase winding 37, 39 and 41 is connected to a diode bridge rectifier circuit as follows: phase 37 is connected between diode 45 and diode 47 such that current of positive polarity will pass through diode 45. Of course, each diode in FIG. 3 symbolically represents a set of parallel diodes. When the current becomes negative, voltage which is also of negative polarity will be blocked by diode 45. On the next half cycle, where current is negative, diode 47 conducts current to the bottom end of generator field winding 61 which is discussed more fully below.

Figure 3:
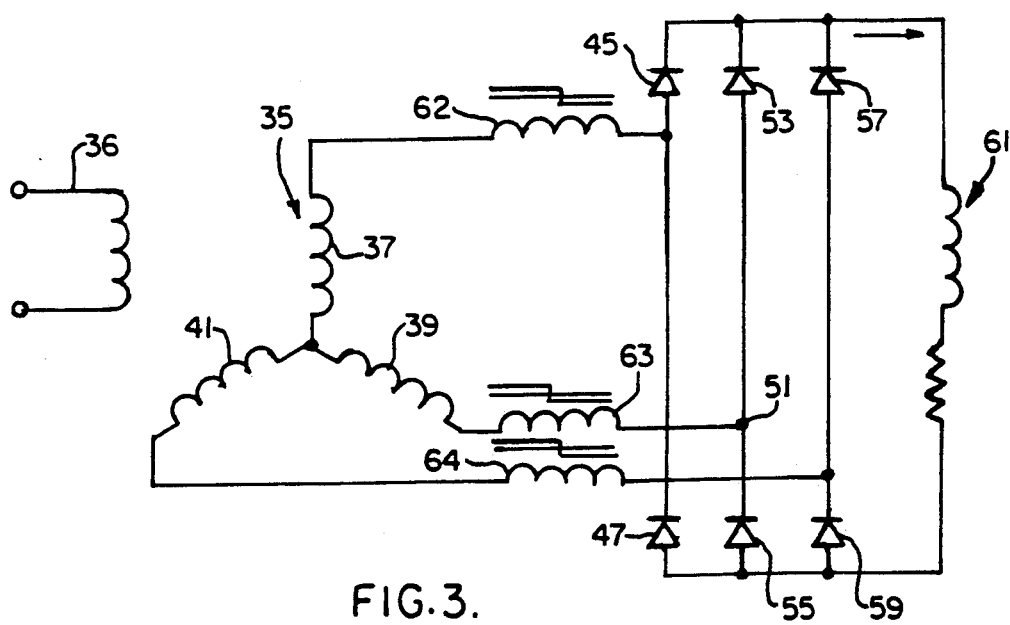
FIG. 3 is an electrical circuit diagram showing the device of the present invention, the diode bridge circuit configuration and the Y-connected ac exciter.

Similarly, the phase designated by reference character 39 is connected at node 51 between diodes 53 and 55. Positive currents will be passed and negative voltages will be cut off by the diode 53 while diode 55 conducts when the current is negative. Phase 41 is connected between diodes 57 and 59 and operates in a similar manner. The bridge rectifier circuit is a rotating bridge rectifier containing, for example, three 2200 volt, 1200 amp diodes in parallel per phase per polarity. This would mean there is a total of 18 diodes as the exemplary system of FIG. 3 is a three-phase system having three diodes per phase per polarity. The rectified current, now dc current, is then supplied to turbine generator field winding 61. In the exemplary system, this winding may be typically a 500 volt, 5500 amp field winding.

Turning now to the operation of the system, and its relation to the device of the present invention, it is well known to those skilled in the art that diodes during reverse recovery cause voltage transients and, in particular, large voltage spikes can be experienced during reverse recovery. Such voltage spikes can, in systems such as the one described herein, be up to a level of about two kilovolts. It is important that spikes such as these be reduced or eliminated in order to preserve the system and to avoid unnecessary stoppages.

Figure 4:
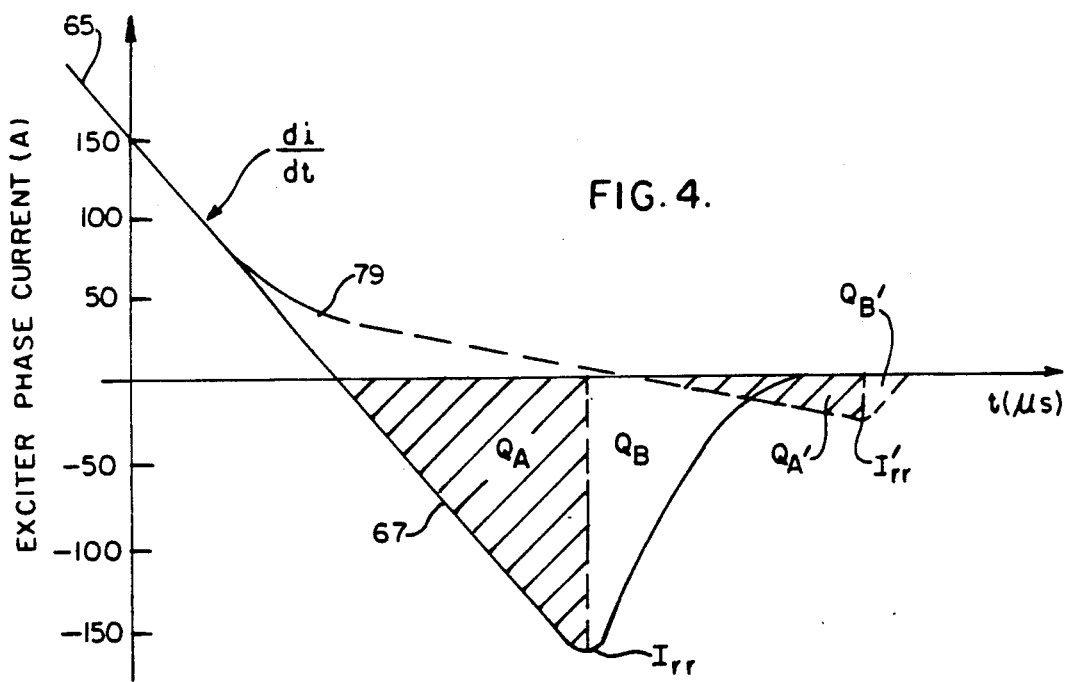
FIG. 4 a graph showing exciter phase current plotted against time at a current level at which an associated diode is approaching turnoff for a particular phase of the system.

A further understanding of the concept of reverse recovery is described with reference to FIG. 4. The graph of FIG. 4 shows exciter phase current in amps plotted against time in microseconds. Curve 65 is a graph of current for a single phase of the system as it approaches zero. When the current falls through zero the associated diode (actually, the three diodes in parallel for that phase and positive polarity) enters reverse recovery before beginning to block current. As is well understood by those skilled in the art, the diode does not immediately begin to block voltage. Instead, the diode allows current to pass through in the negative range during a short time period which is typically on the order of tens of microseconds.

The peak negative current during reverse recovery is designated in FIG. 4 as $I_{rr}$. After reaching this peak the diode enters reverse recovery and the current proceeds back towards zero as shown in FIG. 4. The area under the curve prior to peak current $I_{rr}$ is designated by reference character 69. This area represents diode stored charge, $Q_A$. It is this stored charge that is desired to be reduced by the device of the present invention. Stored charge, in turn, is dependent upon current fall rate, or di/dt. Peak current in reverse recovery and, in turn, stored charge $Q_A$, are also related to reverse recovery energy. More specifically, in the system shown and discussed with reference to FIG. 3, three 2200 volt, 1200 amp diodes are in parallel per phase per polarity. In order to reduce their stored charge by a substantial percentage, such as about fifty percent, an order of magnitude decrease in the current fall rate is required. It can be shown, and is understood by those skilled in the art, that the reverse recovery energy for two phases commutating is as follows:

$$\epsilon = \frac{1}{2}(2L) I_{rr}^2 = Q_A E \qquad \text{Eq. (1)}$$

where
$\epsilon$ = recovery energy (Joules)
L = commutating inductance/phase (henrys)
$I_{rr}$ = max reverse recovery current (amps)
$Q_A$ = total stored diode charge (coulombs)
E = instantaneous ac line to line voltage at diode turnoff The reverse recovery energy is therefore proportional to the diode stored charge, $Q_A$. Diode stored charge is in turn dependent upon current fall rate, di/dt. The dependence of diode stored charge on current fall rate is given by power semi-conductor data sheets which are available to those skilled in the art. However, if current fall rate is reduced then diode stored charge and reverse recovery energy is also reduced. One way of reducing current fall rate is to increase overall machine inductance. The relationship between overall machine inductance, L, current fall rate, di/dt, and voltage, e, is as follows:

$$e = L \frac{di}{dt} \qquad \text{Eq. (2)}$$

In order to increase overall machine inductance and to decrease the current fall rate, di/dt, as shown in FIG. 4, the armature cross slot flux in the unsaturated phase (phase that is turning off) must be increased about 25 times over its normal value at low currents (about 0 to 30 amps) near diode turnoff. The total armature cross slot flux (neglecting tooth-top to tooth-top flux) is the sum of the flux of the top coil and the bottom coil, and the derivation for each are given by the following equations:

$$\Phi_{TOT} = \Phi_{top} = \Phi_{bott} \qquad \text{Eq. (3)}$$

top coil:

$$\Phi_{top} = \frac{1}{2}\left(\frac{\mu_0 l_2 l_a}{W_s}\right)I_1 + \left(\frac{\mu_0 l_3 l_a}{W_s}\right)I_1 \qquad \text{Eq. (4)}$$

bottom coil:

$$\Phi_{bott} = \frac{1}{2}\left(\frac{\mu_0 l_1 l_a}{W_s}\right)I_2 + \left[\frac{\mu_0 (l_2 + l_3)l_a}{W_s}\right]I_2 \qquad \text{Eq. (5)}$$

Figure 5:
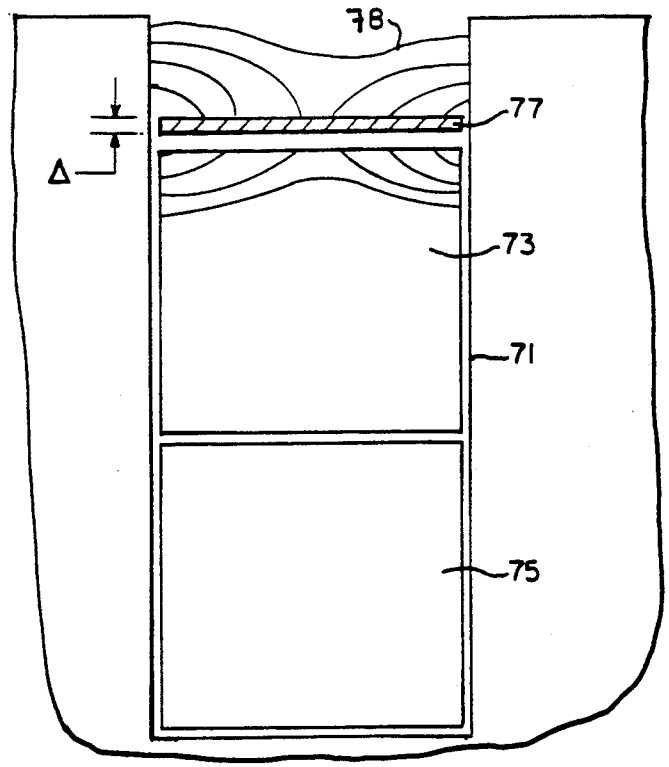
FIG. 5 is a schematic cross section of one slot of an armature in an ac exciter.

These Equations can be better understood with reference to FIG. 5. FIG. 5 is a cross section of one slot 71 in a typical rotating armature of an ac exciter. Slot 71 contains top coil 73 and bottom coil 75. Adjacent to top coil 73 is film member 77 of the present invention. Flux lines 78 schematically depict the flux patterns in the vicinity of film member 77. The thickness of film member 77 is indicated by the dimension arrows. The thickness is determined in accordance with equations which are discussed more fully below.

Referring to Equations 4 and 5 $\mu_0$ is the permeability of free space constant; la is the length of armature slot 71 which in the exemplary system is 32 inches; $W_s$ is the width across slot 71 which in the exemplary embodiment is 0.466 inches; $l_1$ is the length of bottom coil 75 which in the exemplary system is 0.91 inches; $l_2$ is the length of the top coil 73 which in the exemplary system is 0.91 inches; $l_3$ is the length of the armature wedge area above film member 77 which in the exemplary system is 0.5 inches; $I_1$ is the current through top coil 73 and $I_2$ is the current through bottom coil 75.

The total flux $\Phi_{TOT}$ of the system can be determined by solving Equation (3) using the results of Equations (4) and (5). Once Equation (3) is solved, then the total flux is known and the magnitude of increase in machine inductance can be calculated. In order to effect the increase in machine inductance, a saturable reactor member of the present invention is placed, preferably, in each armature slot.

These saturable reactors are shown symbolically in the equivalent circuit of FIG. 3 in which phase 37 is associated with saturable reactor 62, phase 39 includes saturable reactor 63 and phase 41 includes saturable reactor 64. The saturable reactors 62, 63 and 64 are not separate reactors. They are thin film members placed in the slots of the armature. They operate in saturation for most of a current cycle except when current approaches zero for any particular phase. In other words, the saturable reactor of the present invention has little effect on the system until current falls to low levels of approximately about 30 to 10 amps. When this current level is reached, the saturable reactors are no longer in saturation and become linear. As a result, a curve such as dashed curve 79 of FIG. 4 is generated because current fall rate is reduced due to the increase in inductance. The dashed curve shown has a much gentler slope than that of curve 65. It should be noted that the stored charge $Q_A'$ is much less than stored charge $Q_A$ of curve 65. In addition, peak recovery current $I_{rr}'$ is also much lower in magnitude than $I_{rr}$ of curve 65. As noted, curve 79 is a depiction of current for one phase of a system employing the device of the present invention and it should be understood that the present invention operates for each phase of the system and results in an overall reduction in the undesirable effects of diode turnoff.

Although it has been known that saturable reactors will have the effect of reducing diode reverse recovery stored charge, it has heretofore not been understood how to employ saturable reactors within diode wheels spinning at the rates required for rotating armatures such as that discussed herein. The present invention, however, provides a solution to this problem in that thin films of saturable reactor material are placed in the armature slot area along the length of the armature coils. These magnetically permeable film members act to decrease the diode current fall rate and therefore reduce the stored charge when they are in an unsaturated state. (FIG. 4).

The thickness of the film members is determined based upon the armature cross slot flux of the system used in a particular application. By way of example, for top and bottom coils having an equal current at for example 30A, the total cross slot flux in a typical system is $\Phi_{TOT} = 185.44$ micro Wb at 30 amps. The flux, $\Phi_{TOT}$ is given by Eq. (3) above. In such a case the film members of the present invention must carry a flux load of $$\Phi_{tape} = (25)(185.4 \text{uWb}) = 4.63 \text{ mWb} \qquad \text{Eq. (6)}$$

The ratio of $\Phi_{tape}/\Phi_{TOT}$ is then 25. Available grades of material typically saturate at about 1.8T (tesla), therefore, the total thickness is:

$$\Delta = \frac{\Phi_{tape}}{l_a B_{sat}} = \frac{.00463}{(.813)(1.8)} \text{ m} = .00316 \text{ m} = 124 \text{ mils} \qquad \text{Eq. (7)}$$

where $l_a$ is the length of the armature slot 71 (FIG. 5) and $B_{sat}$ is the magnetic induction at saturation.

This thickness requirement is a conservative estimate because the fringing flux field around the tape will increase the slot permeance and because an increase in slot permeance of 25 times is more than enough to overcome the effect of end turn leakage inductance in order to increase the overall machine inductance by one order of magnitude as is desirable in the present invention. The resulting decrease in diode current fall rate reduces the quantity $Q_A$ by approximately fifty percent (Equation 1). The reverse recovery energy is therefore reduced by the same factor. It is preferred to provide a magnetic tape such as METGLASS or PERMALLOY sold by Magnetics, Inc. of Butler, PA.

Figure 6:
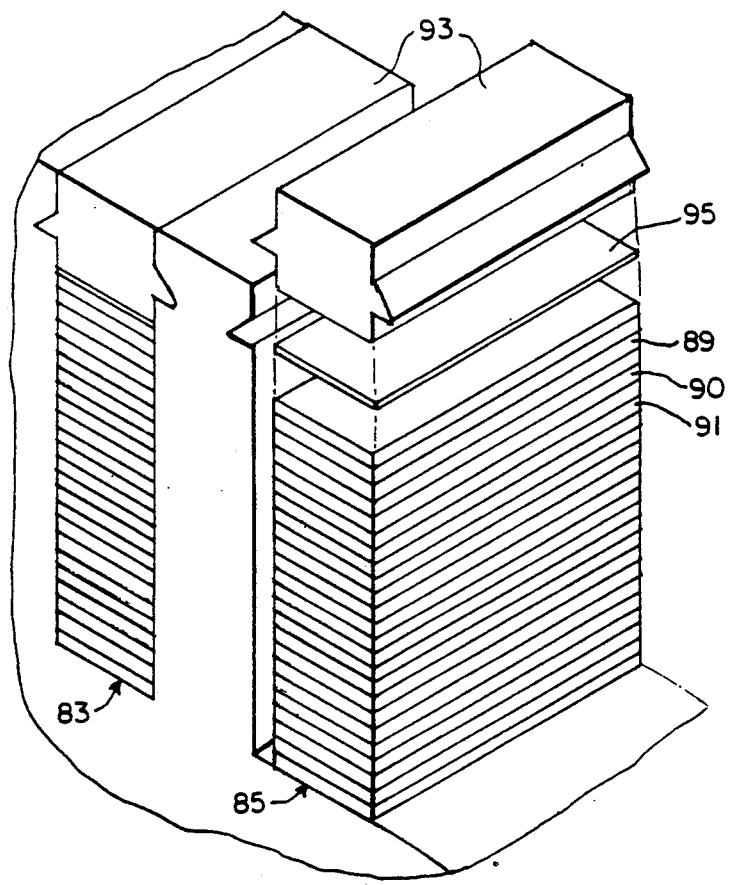
FIG. 6 is a schematic elevation of several slots of an armature showing the device of the present invention employed in the armature wedge area of one slot.

Referring now to FIGS. 5 and 6, the physical placing of the device of the present invention in the system is described in greater detail. As noted herein, in a typical system it is desirable to increase slot permanence 25 times which in turn results in an increase in overall machine inductance of about one order of magnitude. It should be understood that the film member 77 (FIG. 5) of the present invention provides an order of magnitude decrease in current fall rate which results in diode stored charge and reverse recovery energy being reduced by 50%.

Referring now to FIG. 6, in accordance with one aspect of the present invention the film members are shown with existing armature slots. Slots 83 and 85 are exemplary of slots which are typically contained in a rotating armature. Slot 85 contains coils which are made up of individual strands such as 89, 90 and 91 as would be well known to those skilled in the art. The top coil is composed of the upper twelve strands and the bottom coil is composed of the lower twelve individual strands. An armature slot wedge 93 is placed into the slot to retain the coils in a desired position. In accordance with one aspect of the present invention, wedge 93 is fitted with a film member composed of the material as described in the present invention such as member 95. Preferably, all of the wedges for the armature are fitted with the film members such as member 95. These can be inserted into an existing armature slot by simply removing existing wedges and replacing them with newly-adapted wedges. This avoids the need for any rewinding or modification to the windings of existing exciters. In this way, retrofitting of the existing machines can be accomplished without significant disruption.

In operation, the device of the present invention acts to reduce current fall rate for low level currents in the area of diode turnoff to such a degree that the effects of diode reverse recovery are substantially reduced or even eliminated. This allows for reduction in the size of or the elimination of capacitor components such as capacitor 29 of FIG. 2.

It should be appreciated that the device of the present invention describes an apparatus for reducing or eliminating the effects of diode reverse recovery transients. The invention involves a modification to the armature slot buildup in the main ac exciter in a brushless excitation system, which results in a decrease in the required size and weight of the diode wheel snubber assemblies. It should be understood that this novel method and apparatus can be completely and retroactively implemented without rewinding the exciter. In addition, no additional rotating components in the diode wheel are required.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

What is claimed is:

1. In a brushless excitation system containing a multiphase ac exciter and a diode wheel rectifier assembly having at least one diode associated with each polarity of each phase of the system, said multiphase ac exciter having a rotating armature containing a plurality of slots, each slot containing at least one coil, a diode snubber assembly comprising:

at least one elongated saturable reactor film member composed of a magnetically permeable material which has a saturated state and an unsaturated state, and said saturable reactor film member is disposed along a substantial portion of the length of said at least one coil in a slot of said armature, each said reactor film member being of a predetermined thickness such that said film member remains in said saturated state until current for any phase of the system falls to a predetermined current level, and said saturable reactor enters said unsaturated state at said predetermined current level and increases overall exciter inductance whereby current fall rate of said current of said phase is reduced.

2. The diode snubber assembly of claim 1 further comprising:

a plurality of said saturable reactor film members, each said saturable reactor film member being disposed with a slot of said armature along a substantial portion of the length of said coil in said slot.

3. The diode snubber assembly of claim 2 wherein:

said slots of said rotating armature contain a top coil and a bottom coil and said saturable reactor film members are each positioned along a substantial portion of the length of the top coil of a slot of said rotating armature.

4. The diode snubber assembly of claim 3 wherein:

said slots of said rotating armature contain a support wedge for retaining said top coil and said bottom coil in said slot and said saturable reactor film members are each secured on one of said support wedges on a side of said support wedge adjacent to said top coil.

5. The diode snubber assembly of claim 2 wherein: said assembly also includes capacitor means connected in parallel with each of said associated diodes.

6. The diode snubber assembly of claim 1 wherein: said predetermined current level is between 10 and 30 amps and said current fall rate of said current is reduced by about fifty percent.

* * * * *